Inventors
Desiderius Pekár
and Stephen Rybár
by [signature]
Attorney

UNITED STATES PATENT OFFICE 1,988,508

EÖTVÖS BALANCE

Desiderius Pekár and Stephen Rybár, Budapest, Hungary; said Rybár assignor to said Pekár Application April 1, 1930, Serial No. 440,857
In Hungary April 8, 1929

3 Claims. (Cl. 265—1)

We have obtained patent in Hungary, No. P. 6,853, dated April 8, 1929.

The present invention relates to Eötvös torsion balances of the type wherein adjustable deflectors are closely juxtaposed to one or both sides of the balance beam thereof in order to deflect air currents from said beam which would tend to disturb and interfere with the most advantageous operation thereof.

Experience teaches that the position of equilibrium of Eötvös torsion balances is influenced by sudden changes of temperature, often to such an extent as to make readings unreliable and unfit for use. For this reason it sometimes happens that the torsion balance cannot be used for effecting observations during the daytime, which means a serious drawback in practical survey work.

On the basis of the experiments and investigations which have been effected, we have found that the disturbing influence is due to air currents set up inside the instrument.

With the aid of our method according to the present invention and the devices suitable for carrying the same into effect, it has become possible to control these air currents in such a manner as to ensure that they will not influence the position of equilibrium of the torsion balance.

The method according to the present invention consists, substantially, in an arrangement of adjustable bodies, so-called "control surfaces" or "deflectors" being provided in the casing of the balance along, i. e. adjacent to the torsion beam. These deflectors are not mounted on the balance beam, but fastened with screws on the inner side of the bottom or cover or side-walls of the casing of the torsion balance in a suitable relative position with respect to said beam. Thus these deflectors or control surfaces are capable of being made to approach the torsion beam or of being removed to a greater distance from the same, and of being moved along the length of the torsion beam, until they are brought (by displacing them by any of the movements referred to or by any combination of these movements) into the positions empirically found to be the most effective for eliminating said disturbing effects. They are then fixed in these determined positions by means of said screws, or any other suitable fastening means may be used.

Figure 1:
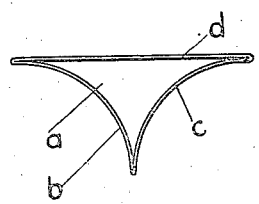
Figure 2:
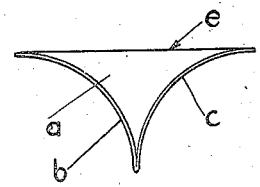
Figure 3:
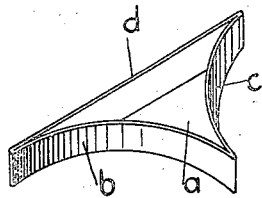
Figure 4:
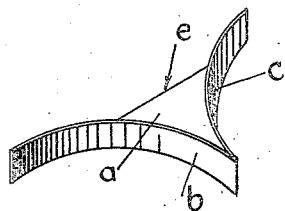
Figure 5:
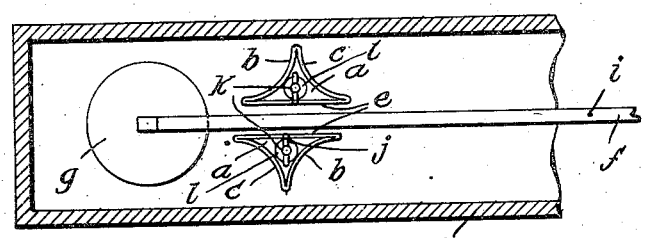

Two embodiments of these deflectors or control surfaces, found in the course of the experiments carried out to be particularly effective, are illustrated by way of example in the accompanying drawings, in plan views in Figures 1 and 2 and in axonometric views in Figures 3 and 4. Figure 5 shows partially the left hand half of an Eötvös torsion balance provided with two pairs of deflectors according to said second embodiment.

In the embodiment shown in Figures 1 and 3, sheet metal walls or strips $b$, $c$, $d$, extending upwards in the vertical direction are provided at the edges of a metal base plate $a$ of substantially triangular shape. The two edges of the triangular base plate $a$ carrying the strips $b$ and $c$ are preferably curved, while the edge carrying the strip $d$ is straight.

The embodiment shown in Figures 2 and 4 differs from the embodiment referred to above by the fact that only two walls $b$ and $c$ are provided along the two curved edges of the metal base plate $a$, whilst no such wall is provided along the straight edge $e$, the deflector or control surface thus being open on this side.

In addition to the above it should be mentioned, that each control surface or deflector may also consist of several surfaces, and that the latter may be flat or curved surfaces.

Control surfaces or deflectors are preferably arranged in pairs, i. e., one on the right-hand side of the torsion beam and one on the left-hand side thereof. Said disposition is particularly illustrated in Figure 5, in which $f$ indicates the torsion beam, $g$ the opening of the lower tube of the balance, $h$ the left hand half of the wall of the casing in horizontal section, and $i$ the point of attachment of the suspension wire of the balance, while $k$ indicates the fastening screws, which are inserted in slots $j$ in the deflectors and are clamped by washers $l$ under the screw heads. The slots $j$ being larger than the screws permit of adjustment of the deflectors.

While each piece of the apparatus according to the invention is uniformly made so as to be accurate and appears also to have uniform quality and accuracy of a required standard, yet each balance must be individually adjusted to the conditions in which it must operate. Hence the casing $h$ which is normally intended to be closed, must be opened and the screws $k$, $k$ slightly unscrewed so that it is possible to adjust each of the two deflectors shown in Figure 5 until they occupy the exact positions which are most advantageous and cause the air currents to have a minimum interfering effect upon balance beam $f$ as determined by numerous experiments and tests. The screws or wing nuts or whatever means are used to secure the deflectors in place are then tightened and permanently set, after which the casing is again closed. Normally further adjustment of the deflectors may not be necessary.

As shown in said Figure 5, the straight edge of each deflector is arranged along the beam $f$ in a position which is substantially parallel to said beam, while the metal base plate $a$ lies flat on the bottom of the casing $h$.

In either form of the deflectors, the principle is substantially the same, namely that the air currents which ordinarily tend to disturb the movements and proper positions of the balance beam by coming into contact with the sides thereof are deflected off said sides in an ingenious manner. If we again consider Figure 5 particularly, an air current caused by slight differences in temperature of either the side of the casing or perhaps some other portion of the apparatus may conceivably tend to come into contact with either or both sides of the balance beam if deflectors or some other means should not be present to brake the contact between said air current and modify its effect on said beam. The air if approaching the beam from the side of the casing $h$ would first be split by the sharp apex at the juncture of concave sides $b$, $c$ of either deflector and would then be deflected along the curved faces of said sides and pass off the extremities of said sides in two currents traveling in opposite directions in parallelism with the beam. Said currents would tend to shift along with them other air movements or currents that otherwise might impinge upon the sides of the beam nearer toward the weight $g$ or toward the other end of the beam. If the air currents should simply move up along the surfaces of curved members $b$, $c$ they would then tend to draw in straight air currents along the beam with them so as to travel toward and up along said sides of the deflectors. In either case, the air currents impinging upon the deflectors will have a tendency to cause any other air currents adjacent to the beam or tending to impinge upon the same to be shifted to directions paralleling said beam, with the final result that all the effects of the air currents are neutralized insofar as the beam is concerned. The other effects of deflectors are more or less well known as a result of investigations with balances of this type, and we of course are not limited to the mere form of operation and effects above enumerated.

Having now fully described our invention, we claim:—

1. Eötvös torsion balance comprising a casing, a torsion beam suspended therein, deflecting bodies adjustably mounted therein next to said beam and fastening means to fix said bodies to one of the inner walls of said casing in a suitable position with respect to said beam, each of said deflecting bodies comprising a substantially triangular base plate, two edges of which are curved, while the third edge is straight and at least two sheet metal walls extending perpendicularly to said plate along said two curved edges, said third, straight edge upon each deflecting body being also disposed substantially parallel with the sides of said torsion beam.

2. Eötvös torsion balance comprising a casing, a torsion beam suspended therein, deflecting bodies adjustably mounted therein next to said beam and fastening means to fix said bodies to one of the inner walls of said casing in a suitable position with respect to said beam, each of said deflecting bodies comprising a substantially triangular base plate, two edges of which are curved, while the third edge is straight and three sheet metal walls extending perpendicularly to said plate along said three edges, the sheet metal wall extending along the straight edge of each deflecting body being disposed parallel with the sides of said torsion beam.

3. Eötvös torsion balance comprising a casing, a torsion beam suspended therein, deflecting bodies adjustably mounted therein next to said beam and fastening means to fix said bodies within said casing in a suitable position relatively to said torsion beam, each of which deflecting bodies comprising a practically triangular base plate at least two edges of which are curved and provided with sheet metal walls extending perpendicularly to said plate along said two curved edges, said deflecting bodies being spaced upon both sides of the torsion beam so that the third edges of the base plates thereof are disposed opposite each other and the junctures of the sheet metal walls extending from the curved edges of said base plates are directed away from said sides of said torsion beam.

DESIDERIUS PEKÁR.
STEPHEN RYBÁR.